(12) United States Patent
Karow

(10) Patent No.: US 7,578,643 B1
(45) Date of Patent: Aug. 25, 2009

(54) SIMULTANEOUS PIPE CUTTING AND CHAMFERING DEVICE

(76) Inventor: Philip Karow, 8820 Karow Rd., Twin Lakes, WI (US) 53181

( * ) Notice: Subject to any disclaimer, the term of this patent is extended or adjusted under 35 U.S.C. 154(b) by 0 days.

(21) Appl. No.: 12/346,446

(22) Filed: Dec. 30, 2008

(51) Int. Cl.
*B23C 3/00* (2006.01)

(52) U.S. Cl. .................. 409/179; 409/138; 409/199; 30/97

(58) Field of Classification Search .......... 409/179, 409/138, 199, 139, 140, 200; 82/113, 128, 82/131; 30/92, 93, 94, 95, 96, 97, 100, 101; 29/33 T, 33 D
See application file for complete search history.

(56) References Cited

U.S. PATENT DOCUMENTS

| | | | | |
|---|---|---|---|---|
| 2,769,234 | A | * | 11/1956 | Young .................. 30/97 |
| 3,431,646 | A | * | 3/1969 | Young .................. 30/97 |
| 3,605,530 | A | * | 9/1971 | Doty .................. 82/113 |
| 3,641,874 | A | | 2/1972 | Rick |
| 3,675,291 | A | | 7/1972 | Girardin |
| 3,688,615 | A | * | 9/1972 | Protze et al. .............. 82/70.2 |
| 3,923,443 | A | | 12/1975 | Emery et al. |
| 3,938,411 | A | | 2/1976 | Jonelis et al. |
| 3,985,051 | A | * | 10/1976 | Brown .................. 82/101 |
| 4,014,640 | A | | 3/1977 | Emery et al. |
| 4,297,061 | A | * | 10/1981 | Wolfe et al. .............. 409/131 |
| 4,412,401 | A | * | 11/1983 | Fundell .................. 451/242 |
| 4,490,909 | A | * | 1/1985 | Wachs et al. .............. 30/97 |
| 4,586,408 | A | | 5/1986 | Goldner |
| 4,682,919 | A | * | 7/1987 | Mitchell .................. 409/179 |
| 4,832,383 | A | | 5/1989 | Roussel |
| 5,096,528 | A | | 3/1992 | Durrenberger et al. |
| 5,148,587 | A | * | 9/1992 | Phelps et al. .............. 29/33 T |
| 5,159,756 | A | * | 11/1992 | McGuire .................. 30/92 |
| 5,522,684 | A | | 6/1996 | Heck |
| 5,564,871 | A | | 10/1996 | Lagsdin |
| 5,778,744 | A | | 7/1998 | Braun et al. |
| 5,820,890 | A | | 10/1998 | Kobayashi |
| 5,894,772 | A | * | 4/1999 | Nodar .................. 82/113 |
| 6,109,151 | A | | 8/2000 | Braun et al. |

(Continued)

FOREIGN PATENT DOCUMENTS

EP        513524 A2 * 11/1992

(Continued)

OTHER PUBLICATIONS

George Fischer, LLC, GF Piping Sytems data page (printed May 16, 2008). <www.us.piping.georgefischer.com>.

(Continued)

*Primary Examiner*—Erica E Cadugan
(74) *Attorney, Agent, or Firm*—Jansson Shupe & Munger Ltd.

(57) ABSTRACT

A mobile device for simultaneously cutting and chamfering a pipe is provided having a frame, at least one pipe collet-clamp attached to the frame and defining a principal axis, a split carriage rotatably mounted with respect to the frame about the axis and adjacent to the clamp(s), a router affixed to the split carriage and having a cutting-chambering bit, and a drive motor for rotating the carriage. The router orbits around the pipe and simultaneously cuts it into two chamfered pipes. A method is also provided for cutting through a pipe and chambering the cut ends thereof.

10 Claims, 12 Drawing Sheets

U.S. PATENT DOCUMENTS

| | | | |
|---|---|---|---|
| 6,129,488 | A | 10/2000 | Fahr |
| 6,491,066 | B1 | 12/2002 | Pitman et al. |
| 6,521,862 | B1 | 2/2003 | Brannon |
| 6,666,062 | B2 | 12/2003 | Dole et al. |
| 6,918,278 | B2 | 7/2005 | Dole et al. |
| 6,938,313 | B2 * | 9/2005 | Viola et al. ............ 29/33 T |
| 6,945,146 | B2 | 9/2005 | Le Gallais |
| 6,993,848 | B2 | 2/2006 | Snyder, Sr. et al. |
| 7,029,211 | B2 | 4/2006 | Oswald |
| 7,270,505 | B2 * | 9/2007 | VanderPol et al. ......... 409/178 |

FOREIGN PATENT DOCUMENTS

| | | | |
|---|---|---|---|
| FR | 2793431 A3 | * | 11/2000 |
| GB | 2295787 A | * | 6/1996 |
| JP | 52-036387 A | * | 3/1977 |
| JP | 54-136561 A | * | 10/1979 |
| JP | 55-125919 A | * | 9/1980 |
| JP | 60-006307 A | * | 1/1985 |
| JP | 63-150105 A | * | 6/1988 |

OTHER PUBLICATIONS

Glastar Corporation homepage (2 pages, printed May 16, 2008), <www.glastar.com>.

IPS Corp. pipe support system data page (printed May 16, 2008). <www.ipscorp.com/watertite/pipesupports>.

Reed Manufacturing Company data page (printed May 16, 2008). <www.reedmfgco.com>.

Tri Tool Inc. product data page (2 pages, printed May 16, 2008). <www.tritool.com/products.html>.

Wheeler-Rex Professional Tools data page (2 pages, undated). <www.wheelerrex.com>.

* cited by examiner

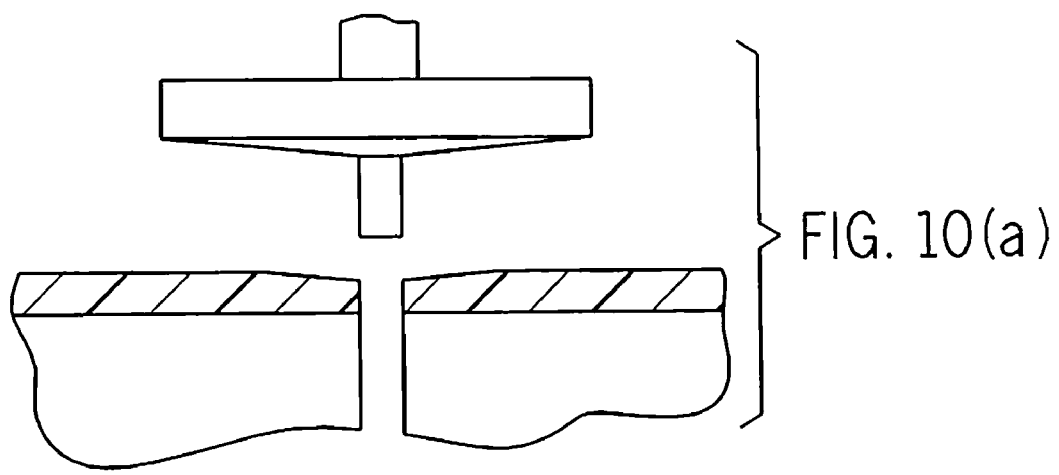
FIG. 10(a)
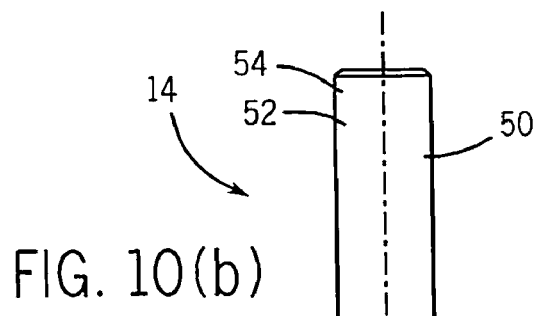
FIG. 10(b)
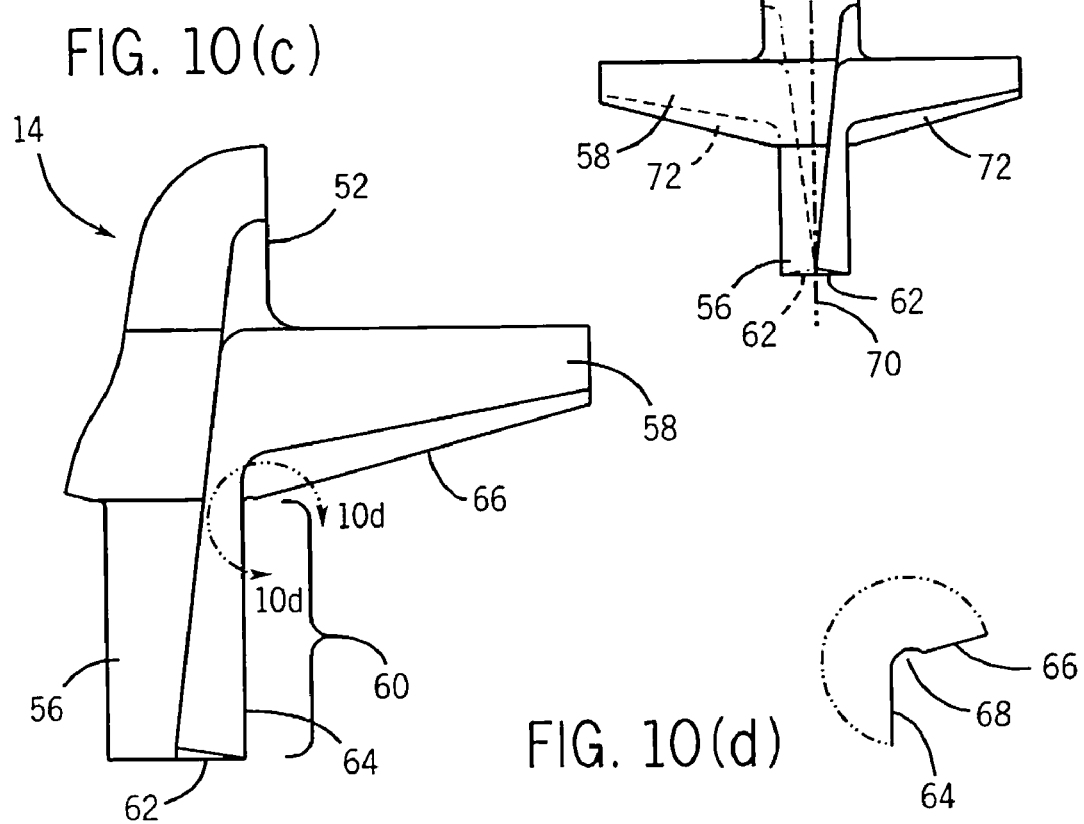
FIG. 10(c)
FIG. 10(d)

SIMULTANEOUS PIPE CUTTING AND CHAMFERING DEVICE

FIELD OF THE INVENTION

This invention is related generally to devices for cutting and chambering pipe and more particularly to devices that are mobile and can simultaneously cut through a pipe and chamber the cut ends.

BACKGROUND OF THE INVENTION

Devices which cut and chamber pipe are used in numerous operations which require pipe to be cut to certain lengths and which also require the pipe after cutting to have a factory-like chamber on the pipe ends. Such cutting/chambering devices in the prior art typically consist of a driving motor with a saw blade that is manually guided around the pipe to cut the pipe to the desired length. The pipe is then chambered with a milling cutter in an additional process after it has been cut. The cutting/chamfering devices in the prior are perform the cutting and chambering process as two individual steps. Each pipe end must be separately chambered after it is cut. Examples of these prior art devices are disclosed in the following United States patents: U.S. Pat. No. 6,129,488 (Fahr) and U.S. Pat. No. 3,675,291 (Girardin).

The cutting/chamfering devices of the prior art have, however, a number of problems and shortcomings. They often are not mobile and do not have the ability to field-cut pipe and chamber the cut ends in one step as opposed to the common practice of manually cutting through the pipe and then chamfering one end at a time using a cut-off saw. It would be desirable to have a cutting/chambering device which is mobile and provides the ability to field-cut pipe and chamber the cut ends in one step through the use of a single tool. Having a device such as this would make the cutting/chamfering of a pipe efficient and not a time-consuming two-step process.

In addition, most cutting/chamfering devices of the prior art achieve a cut and bevel that is inherently inconsistent and inferior. A primary concern is that a non-uniform bevel is more likely to cut seals used in pipe connections and create expensive waste of materials. Furthermore, it is an unsafe practice, not the least because a cut-off saw is not designed to be used as an angle grinder. This can make the process inconsistent and inferior. It would be desirable to have a cutting/chambering device which overcomes these problems by allowing the user to quickly and accurately cut and chamfer both cut ends simultaneously on various sized pipes, including the most common pipe sizes used in construction (6", 8", 10" and 12") as well as pipes of larger sizes.

Additionally, most cutting/chamfering devices of the prior art employ practices which could be unsafe. It would also be desirable to have a cutting/chamfering device which is safe and easy to use during operation. A desirable feature would be to have a motor carriage hold the pipe in a secure manner and travel around the pipe rather than a pipe rotating around a cutter. A feature such as this would contribute to the safety of the device.

This invention meets these needs and overcomes other problems and shortcomings in the prior art with a cutting/chamfering device that is mobile, cuts/chamfers pipe in one step, quickly and accurately cuts/chamfers pipe and is safe to operate.

OBJECTS OF THE INVENTION

It is an object of this invention to provide a cutting/chamfering device that is able to cut/chamfer pipe in one step through the use of one tool, thereby making the device efficient and easy to use.

Another object is to provide a cutting/chamfering device that is mobile.

Yet another object is to provide a cutting/chamfering device that accurately cuts and chamfers pipe.

Still another object is to provide a cutting/chamfering device that can be operated in a safe manner.

These and other objects of the invention will be apparent from the following descriptions and from the drawings.

SUMMARY OF THE INVENTION

This invention is a mobile device for simultaneously cutting and chamfering a pipe. The mobile device comprises a frame, at least one pipe collet-clamp attached to the frame and defining a principal axis, a split carriage rotatably mounted with respect to the frame about the axis and adjacent to the clamp(s), a router affixed to the split carriage and having a cutting-chamfering bit, and a drive motor for rotating the carriage. The router orbits around the pipe and simultaneously cuts it into two chamfered pipes.

In highly preferred embodiments, pipe-end supports are attached to the frame on opposite sides of the router. It is preferred that the router has spring-loaded pipe-follower pins on either side of the bit to force the bit away from the pipe during out-of-round pipe conditions. Preferably, the router is spring-loaded thereby to accommodate out-of-round pipe conditions.

In highly preferred embodiments, the carriage has pipe-contact rollers thereon to facilitate relative rotation with the pipe. It is also highly preferred that the frame has carriage-guide rollers thereon to maintain the axial position of the carriage.

It is most preferred that the drive motor rotates the carriage in forward and reverse directions. In some embodiments, the device also includes a set of interchangeable collet-clamp(s) to accommodate common pipe sizes.

In some embodiments, the device includes a frame, at least one pipe support attached to the frame and defining with the pipe a principal axis, a split carriage mounted with respect to the frame about the axis and adjacent to and relatively rotatable with respect to the supported pipe, a router affixed to the split carriage and having a cutting-chamfering bit, and a drive motor for motivating relative rotation of the pipe and the carriage.

Highly preferred embodiments include a bit for simultaneously cutting and chamfering a pipe which includes a shaft defining an axis and having a shank portion at its proximal end and a working portion at its distal end. Preferable the bit also includes a working portion which has a distal-most depth-cutting portion with (a) at least one axially-offset leading cutting edge at the circumference of the shaft and (b) a substantially axially-parallel lateral cutting edge extending from the distal end along the length of the depth-cutting portion. It is highly preferred that the working portion also include at least one chamfer-cutting portion between the depth-cutting portion and the shank portion.

Preferably the bit includes a relief void defined between the depth-cutting portion and the chamfer-cutting portion. The bit also includes a pair of leading cutting edges spaced by 180 degrees about the shaft axis. It is highly preferred that the bit has a pair of chamfer-cutting edges spaced by 180 degrees about the shaft axis.

The present invention also includes a method of cutting through a pipe and chamfering the cut ends thereof. In this inventive method, the simultaneously cutting through a pipe and chamfering the cut ends of the pipe comprises the steps of supporting a pipe at axial locations on either side of an intended cutting zone on the pipe and orbiting a router having a cutting-chamfering bit 360 degrees around the pipe to simultaneously cut through the pipe and chamfer the cut ends.

It is highly preferred that the method also includes clamping the pipe with pipe collet-clamps and a preliminary step of selecting from a collet-clamp set collet-clamps sized for the pipe to be cut. It is most preferred that the method also includes providing a split carriage rotatably mounted with respect to a frame about the pipe axis, the router being affixed to the split carriage and rotating the carriage about the clamped pipe.

The term "split carriage" as used herein refers to a carriage which can be opened to receive a pipe along the principle axis and securely closed with the pipe in place.

BRIEF DESCRIPTION OF THE DRAWINGS

The drawings illustrate a preferred embodiment including the above-noted characteristics and features of the invention. The device will be readily understood from the descriptions and drawings. In the drawings:

FIG. 10(a) is a sectional view of the router bit of the pipe-cutting/chamfering device of FIG. 1;

FIG. 10(b) is a perspective view of the router bit of the pipe-cutting/chamfering device of FIG. 1;

FIG. 10(c) is a sectional view of the router bit of the pipe-cutting/chamfering device of FIG. 1;

FIG. 10(d) is a further view of the router bit embodiment of FIG. 10C taken in the direction of line 10d-10d;

DETAILED DESCRIPTION OF PREFERRED EMBODIMENTS

Figure 1:
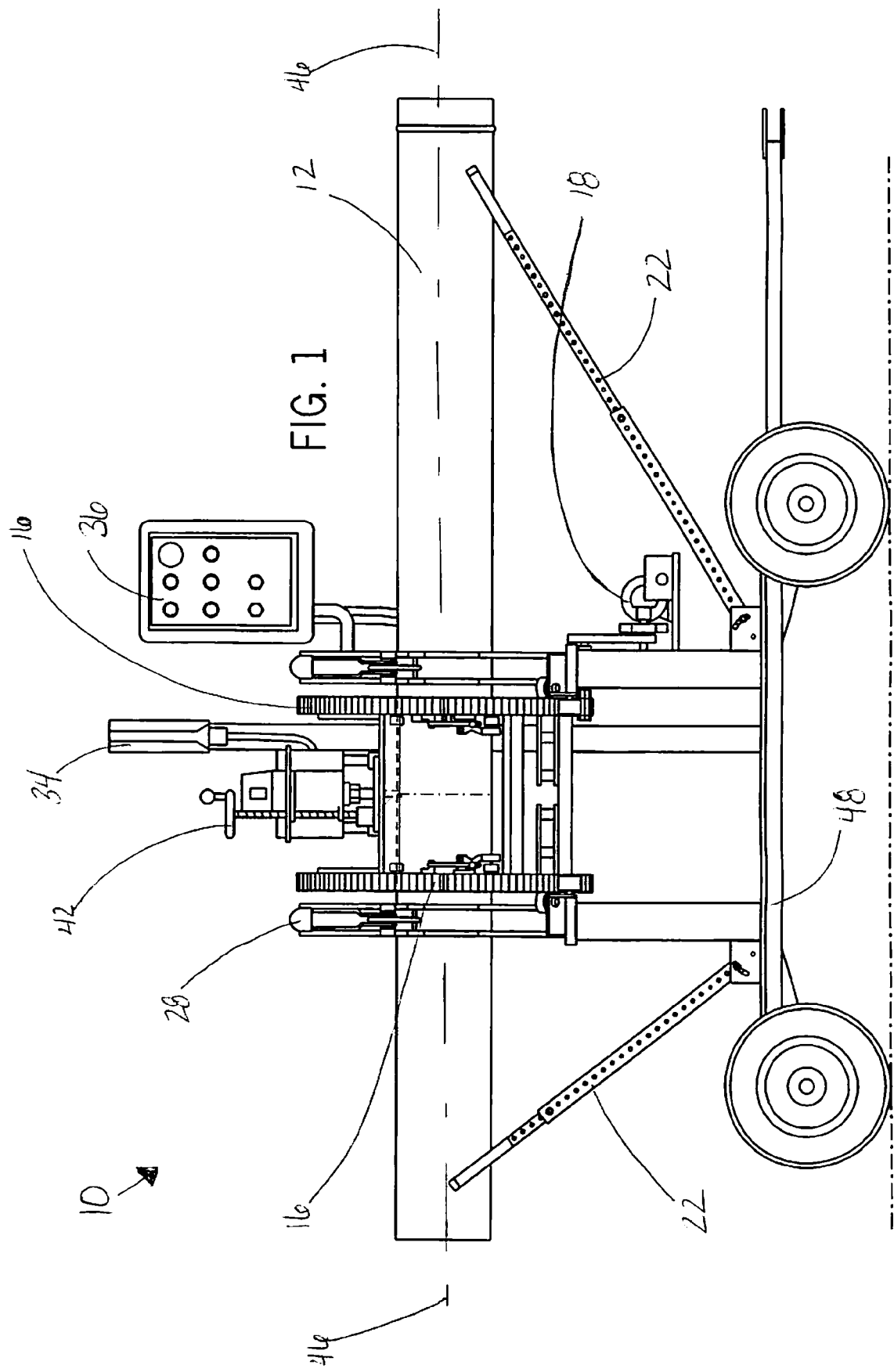
FIG. 1 is a perspective view of a pipe-cutting/chamfering device clamping a pipe.

FIGS. 1-14 illustrate and mobile device 10 for simultaneously cutting and chamfering a pipe 12 including a frame 48, at least one pipe collet-clamp 28 attached to the frame 48 and defining a principal axis 46, a split carriage 16 rotatably mounted with respect to the frame 48 about the axis 46 and adjacent to the clamp(s) 28, a router 38 affixed to the split carriage 16 and having a cutting-chamfering bit 14 and a drive motor 18 for rotating carriage 16. As illustrated in FIGS. 1-4 and 13, router 38 orbits around pipe 12 simultaneously cutting it into two chamfered pipes 12.

Figure 10:
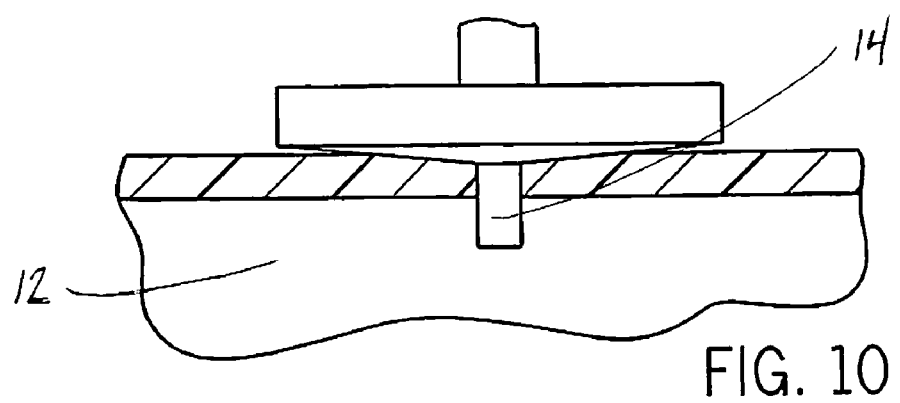
FIG. 10 is a perspective view of the router bit of the pipe-cutting/chamfering device of FIG. 1.
Figure 11:
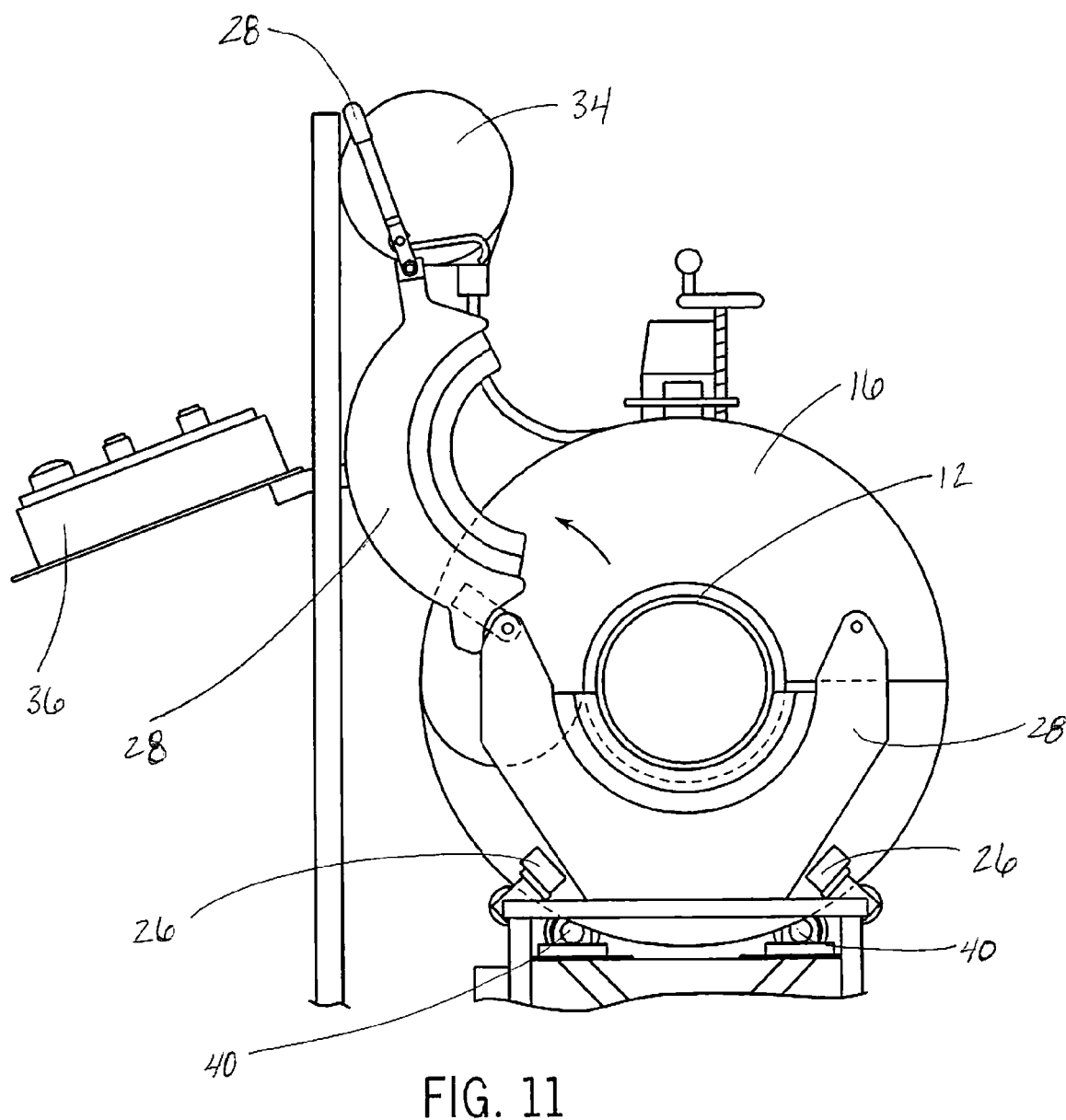
FIG. 11 is a side view of the pipe clamp of the pipe-cutting/chamfering device of FIG. 1 in the open position.

FIGS. 1-4, 7, 11 and 13-14 illustrate that pipe-cutting/chamfering device 10 is the combination of the traveling carriage 16 which travels around pipe 12 and a custom-designed bit 14 (illustrated in FIG. 10(a)) which simultaneously cuts pipe 12 and chamfers both cut ends quickly and accurately. FIGS. 10-10(d) illustrate custom-designed bit 14. During operation, pipe 12 remains stationary while carriage 16 rotates around the entire circumference of pipe 12 and then rotates back to the starting position.

Pipe-cutting/chamfering device 10 utilizes a single, custom-designed bit 14 that performs both the plunge cut and chamfer. By varying the depth and contour of bit 14, the pipe-cutting/chamfering device 10 could be useful in other fields that require chamfering, such as preparation of metal pipe for welding. When cutting metal pipe 12 the cutting speed and feed rates may be reduced.

Router 38 is spring-loaded to maintain smooth cutting and/or beveling over imperfect surfaces (such as out-of-round pipe) and avoids potential damage to the equipment as seen in FIGS. 7-10. The springs are located internally and apply downward pressure on bit 14. The springs are the main source of downward movement of bit 14.

Bit 14 includes a shaft defining an axis 70 as seen in FIGS. 10(b)-10(c). Bit 14 includes a shank portion 52 at its proximal end 54 and a working portion 58 at its distal end 56 as illustrated in FIG. 10(b). Preferably, bit 14 also includes working portion 58 which has a distal-most depth-cutting portion 60 with at least one axially-offset leading cutting edge 62 at the circumference of the shaft 50 and a substantially axially-parallel lateral cutting edge 64 extending from distal end 56 along the length of depth-cutting portion 60 as seen in FIGS. 10(b)-10(d). Working portion 58 also includes at least one chamfer-cutting portion 66 between depth-cutting portion 60 and shank portion 52.

FIGS. 10(c)-10(d) illustrate that bit 14 includes a relief void 68 defined between depth-cutting portion 60 and chamfer-cutting portion 66. Bit 14 also includes a pair of leading cutting edges 62 spaced by 180 degrees about the shaft axis 70. Bit 14 has a pair of chamfer-cutting edges 72 spaced by 180 degrees about the shaft axis 70.

As illustrated in FIGS. 1, 8 and 12-13, pipe-cutting/chamfering device 10 includes a carriage clamp 20 and also includes pipe-end supports 22 attached to the frame on opposite sides thereof. Pipe-end supports 22 are fully adjustable in height and length.

Figure 12:
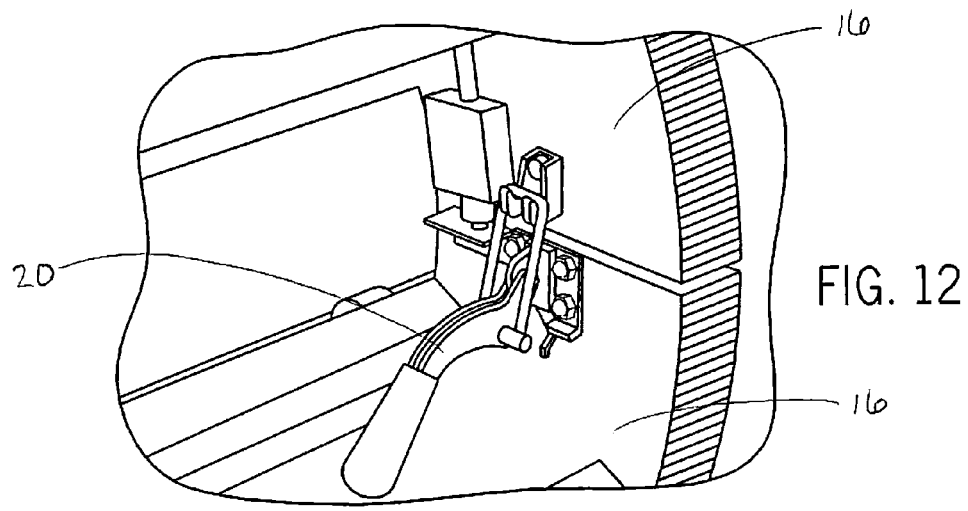
FIG. 12 is a perspective view of the carriage clamp of the pipe-cutting/chamfering device of FIG. 1.

Pipe-cutting/chamfering device can include one carriage clamp 20 or numerous carriage clamps 20. Carriage clamps 20 are quick-release, toggle-style clamps for quick opening and closing of carriage 16 as illustrated in FIG. 12.

Figure 2:
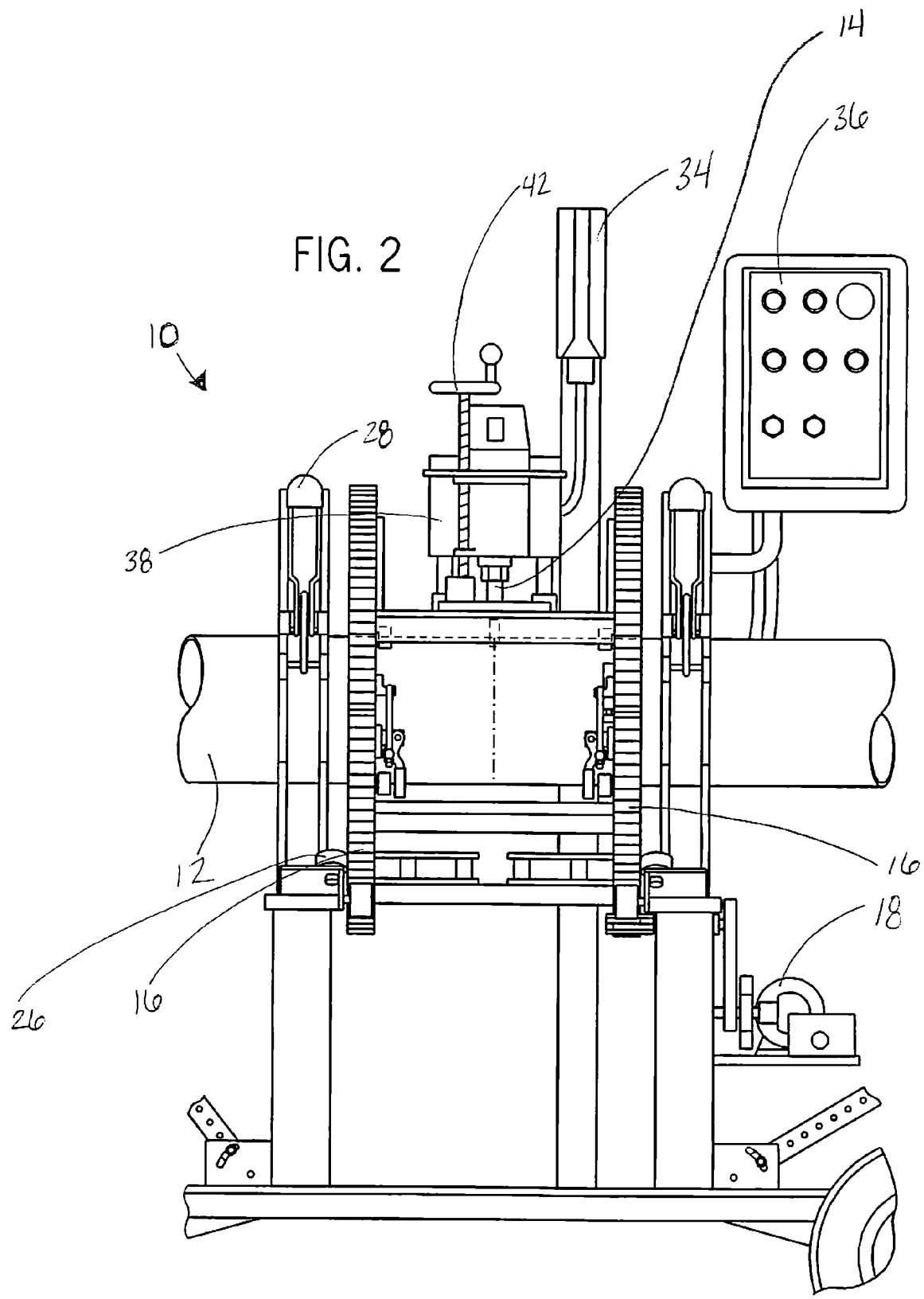
FIG. 2 is a perspective view of the pipe-cutting/chamfering device of FIG. 1.
Figure 3:
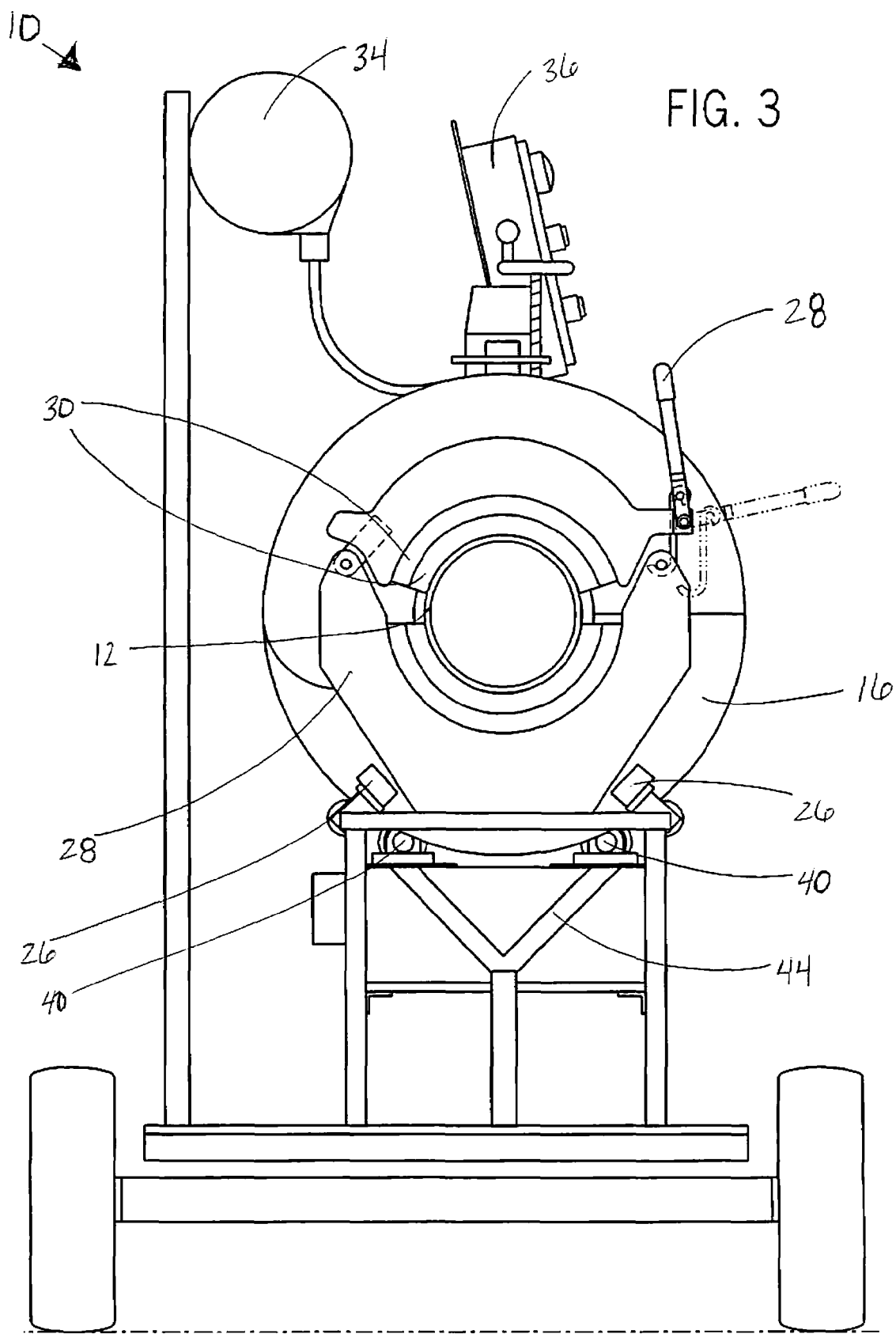
FIG. 3 is a side view of the pipe-cutting/chamfering device of FIG. 1.
Figure 4:
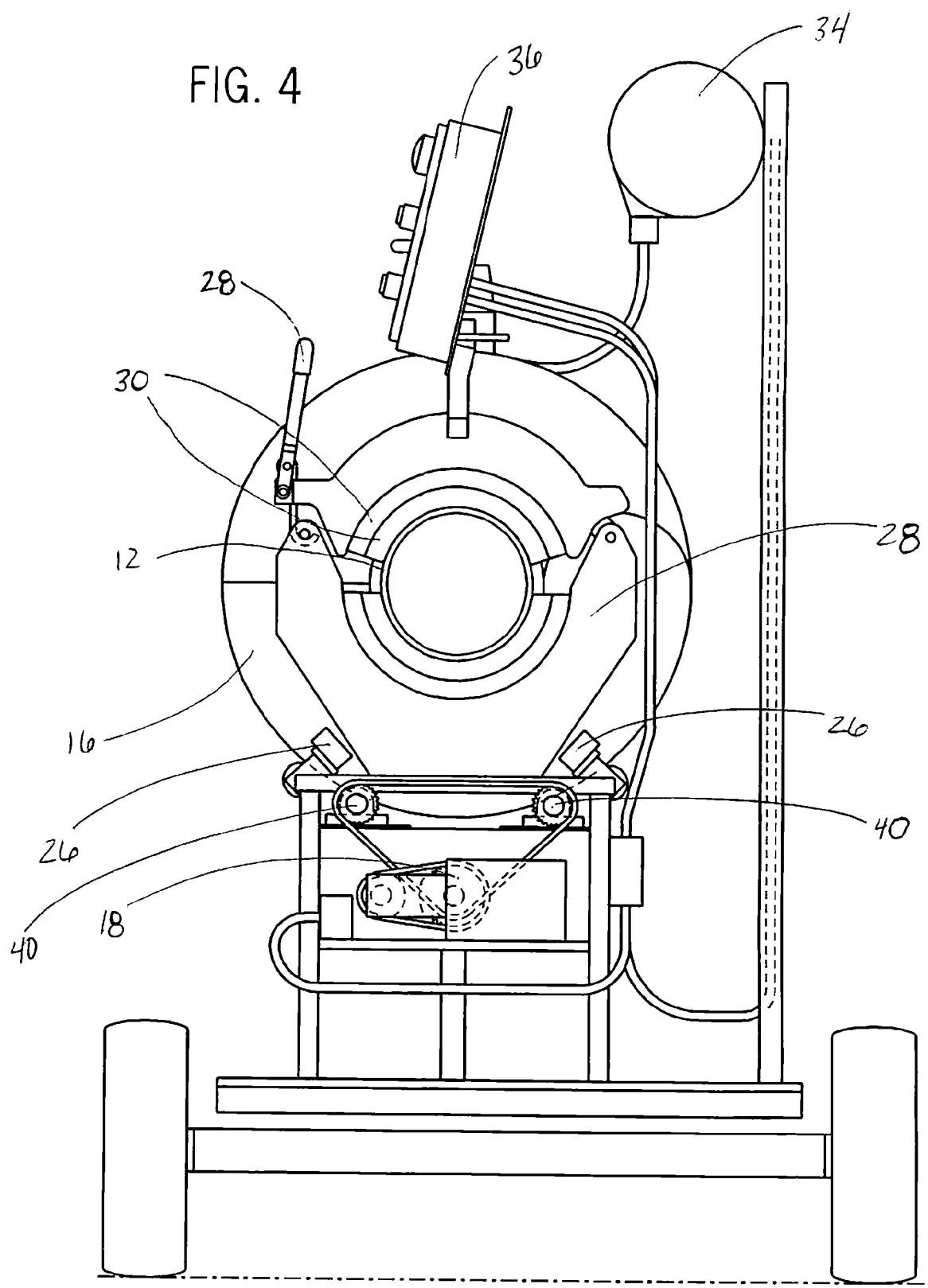
FIG. 4 is a side view of the pipe-cutting/chamfering device of FIG. 1.

Pipe-cutting/chamfering device 10 can include one pipe collet-clamp 28 or numerous pipe collet-clamps 28. Pipe collet-clamps 28 are quick-release, toggle-style clamps for quick opening and closing of the clamp 28. Pipe collect-clamps 28 temporarily lock pipe 12 in a set position for cutting and chamfering as seen in FIGS. 1-3. An additional function of pipe collet-clamp 28 is to apply radial force to maintain a uniform pipe 12 diameter. Device 10 also includes a set of collets 30 which are removable and interchangeable to accommodate various common pipe sizes as see in FIGS. 3-4.

Figure 6:
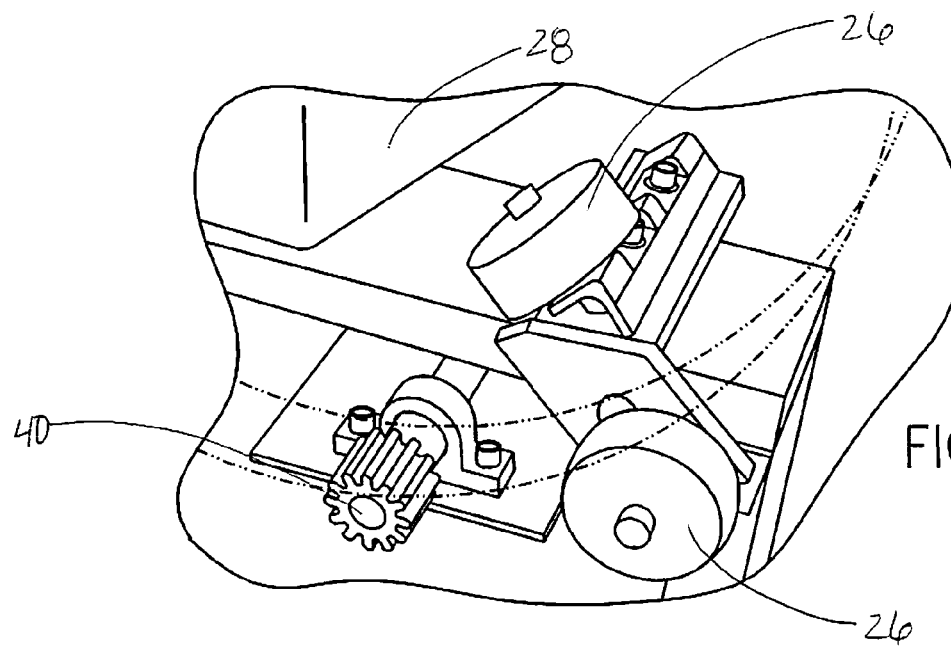
FIG. 6 is a perspective view of the carriage-guide rollers of the pipe-cutting/chamfering device of FIG. 1.
Figure 7:
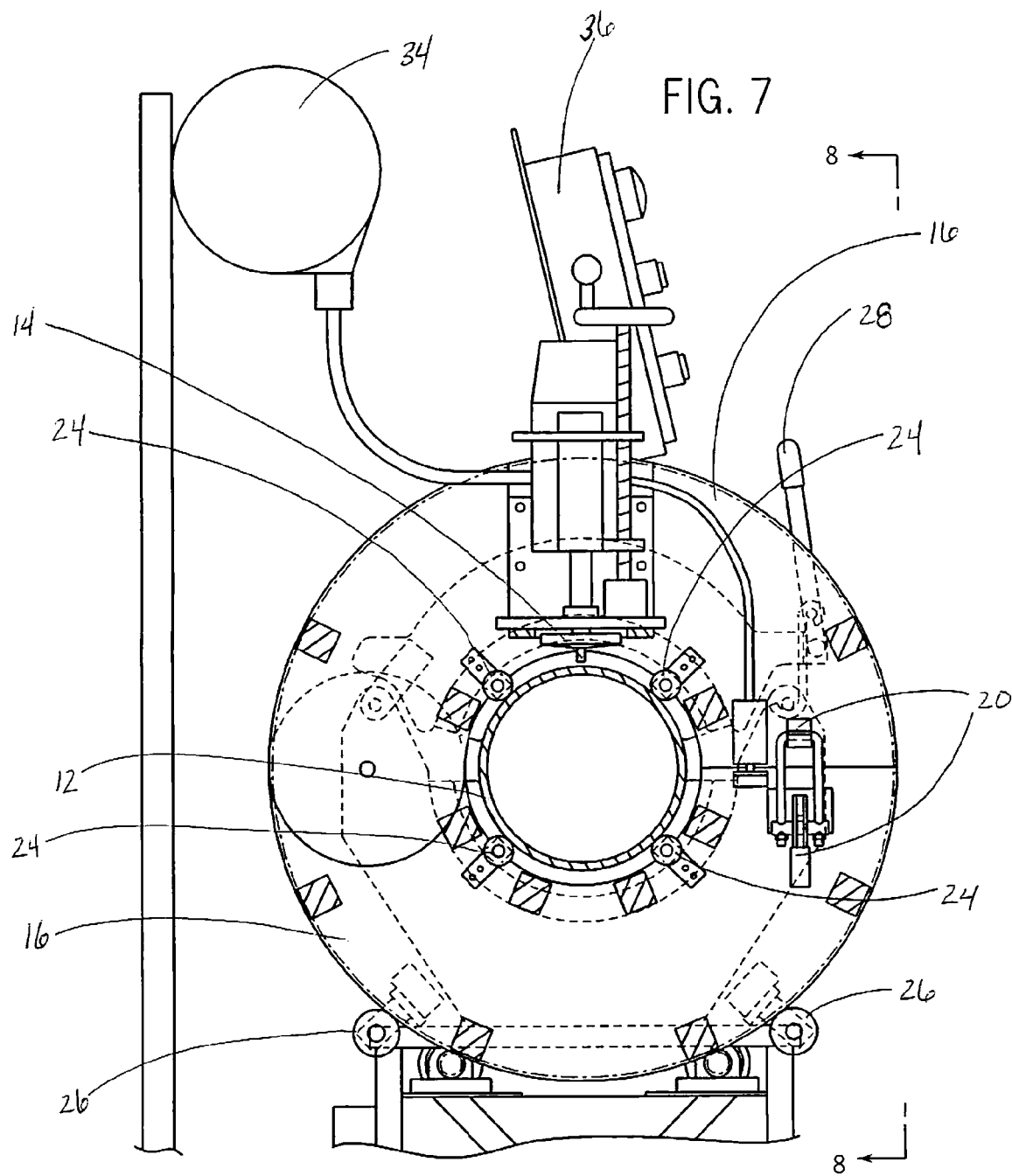
FIG. 7 is a side view of the carriage and router of the pipe-cutting/chamfering device of FIG. 1.
Figure 8:
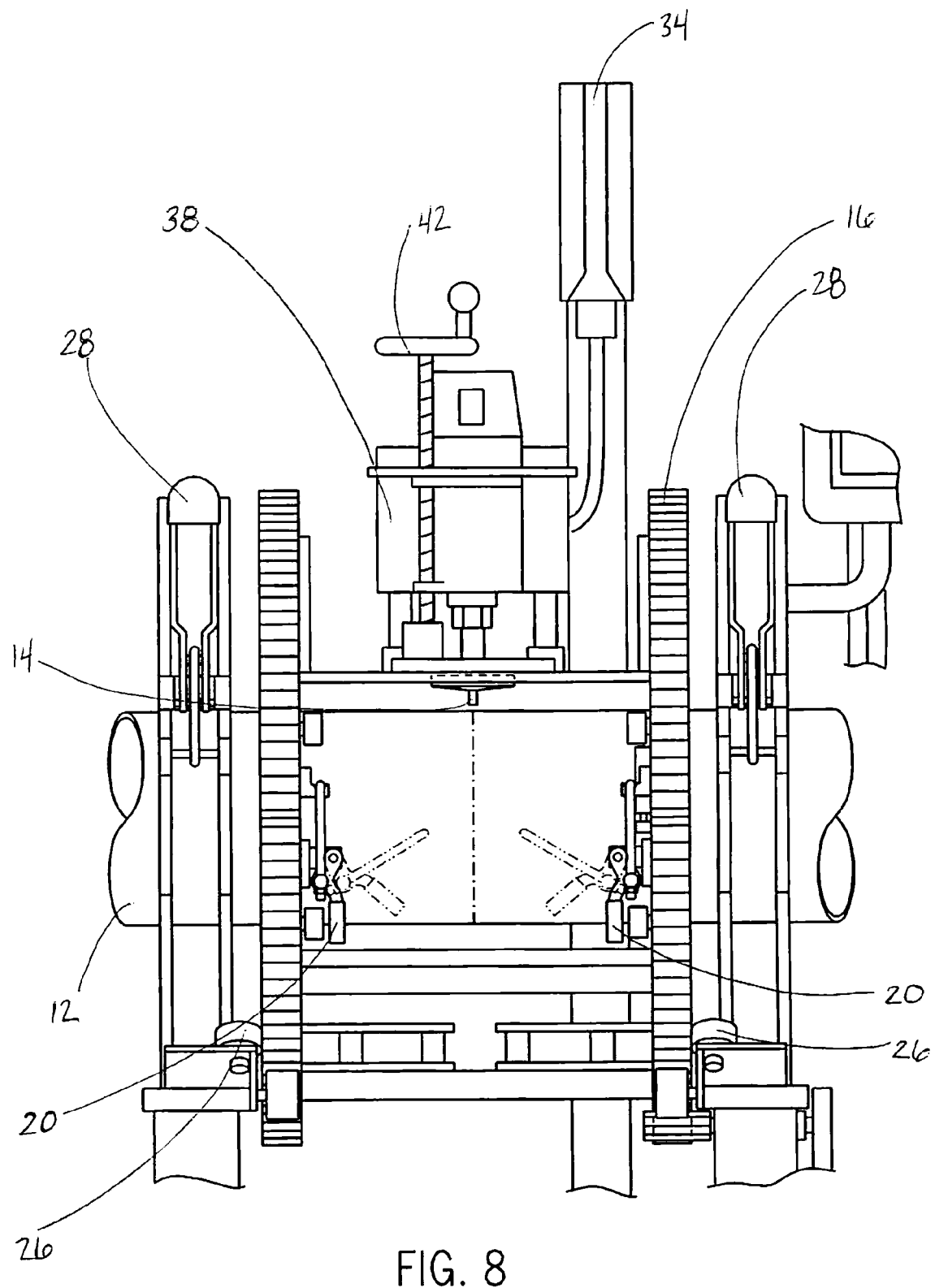
FIG. 8 is a front elevation view of the pipe-cutting/chamfering device of FIG. 1.
Figure 9:
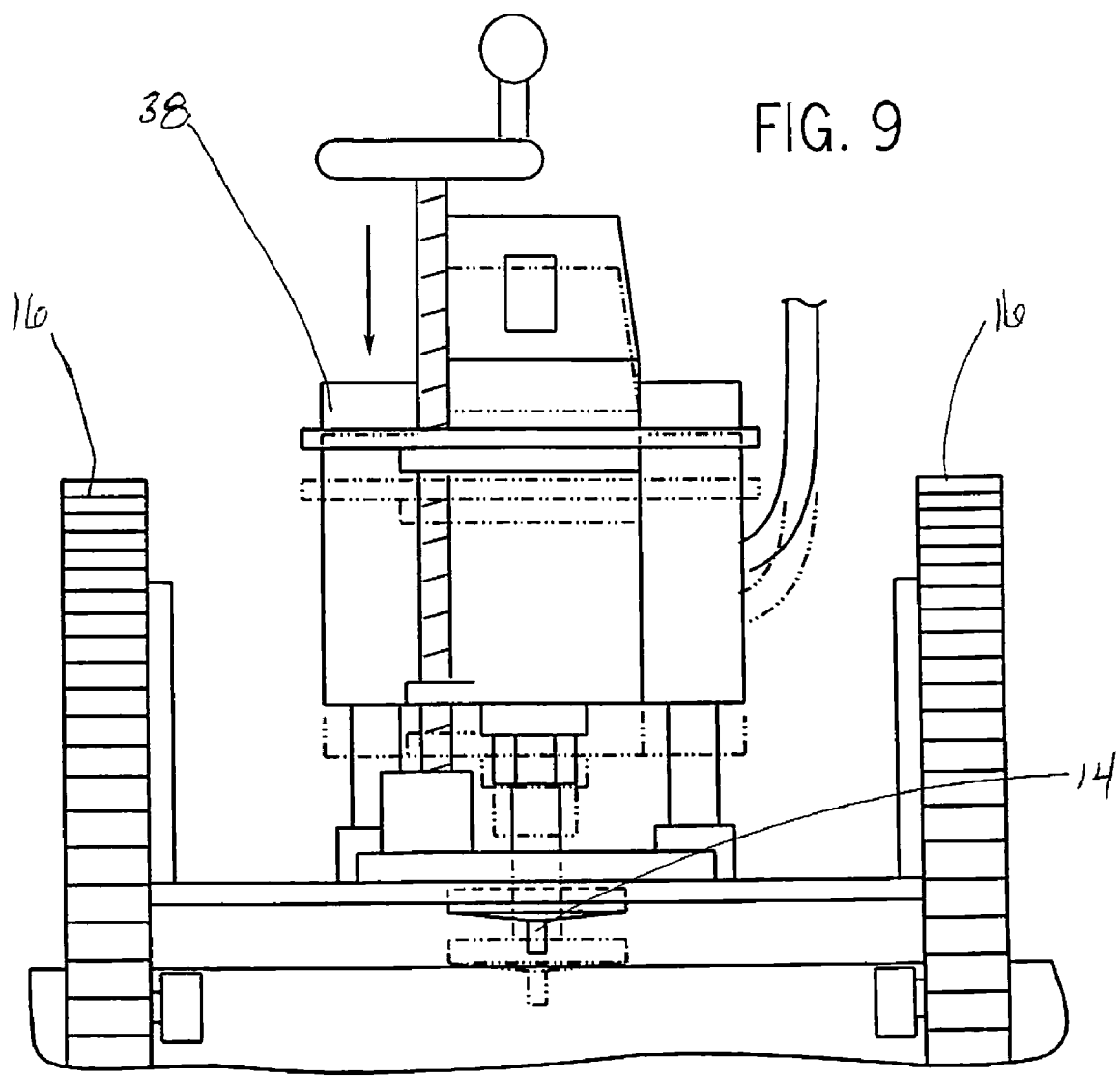
FIG. 9 is a perspective view of the router and router bit of the pipe-cutting/chamfering device of FIG. 1.

FIGS. 2-4 and 6-7 illustrate the carriage 16 includes at least one pipe-contact roller 24 and at least one carriage-guide roller 26. Pipe-contact rollers 24 are illustrated in FIG. 7 and carriage-guide roller 26 are illustrated in FIG. 6. The function of pipe-contact rollers 24 is to facilitate relative rotation with the pipe as illustrated in FIG. 7. Pipe-contact rollers 24 are adjustable to accommodate common size pipe 12 diameters.

Figure 13:
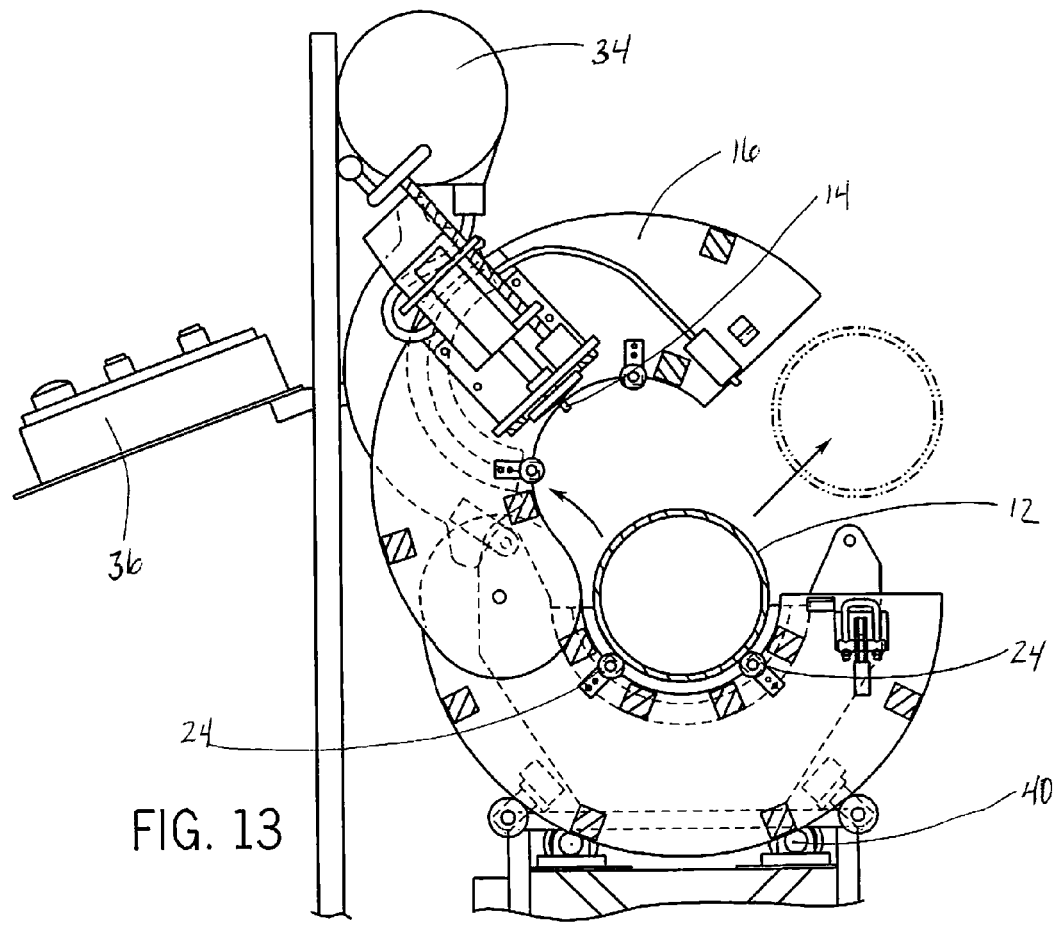
FIG. 13 is a side view of the carriage and pipe collet-clamp of the pipe-cutting/chamfering device of FIG. 1 in the open position.

The function of carriage-guide rollers 26 is to maintain the axial position of the carriage 16 as seen in FIG. 6. Carriage-guide rollers 26 are fully adjustable and maintain lateral load on both sides of carriage 16 to ensure straight cutting of pipe 12. Additionally, carriage-guide rollers 26 support carriage 16 while it is in an open position allowing for removal and installation of pipe 12 as seen in FIG. 13.

Operation of the pipe-cutting/chamfering device 10 is safe and easy to use. Rather than a pipe 12 rotating around a bit 14 or other cutting device, carriage 16 of the pipe-cutting/chamfering device 10 holds pipe 12 securely and travels around pipe 12 as seen in FIGS. 1-4. Power cord and retractable cord reel 34 allow power cord 34 to extend and retract with carriage 16. Each of these features contribute to the safety of device 10.

Carriage 16 is gear-driven and includes a pivotal yoke 44 which allows pinion gears 40 to maintain optimum gear engagement as seen in FIG. 3. Pivotal yoke 44 allows pinion gears 40 to move freely side to side and up and down on carriage 16 to ensure positive gear contact at all times.

Figure 14:
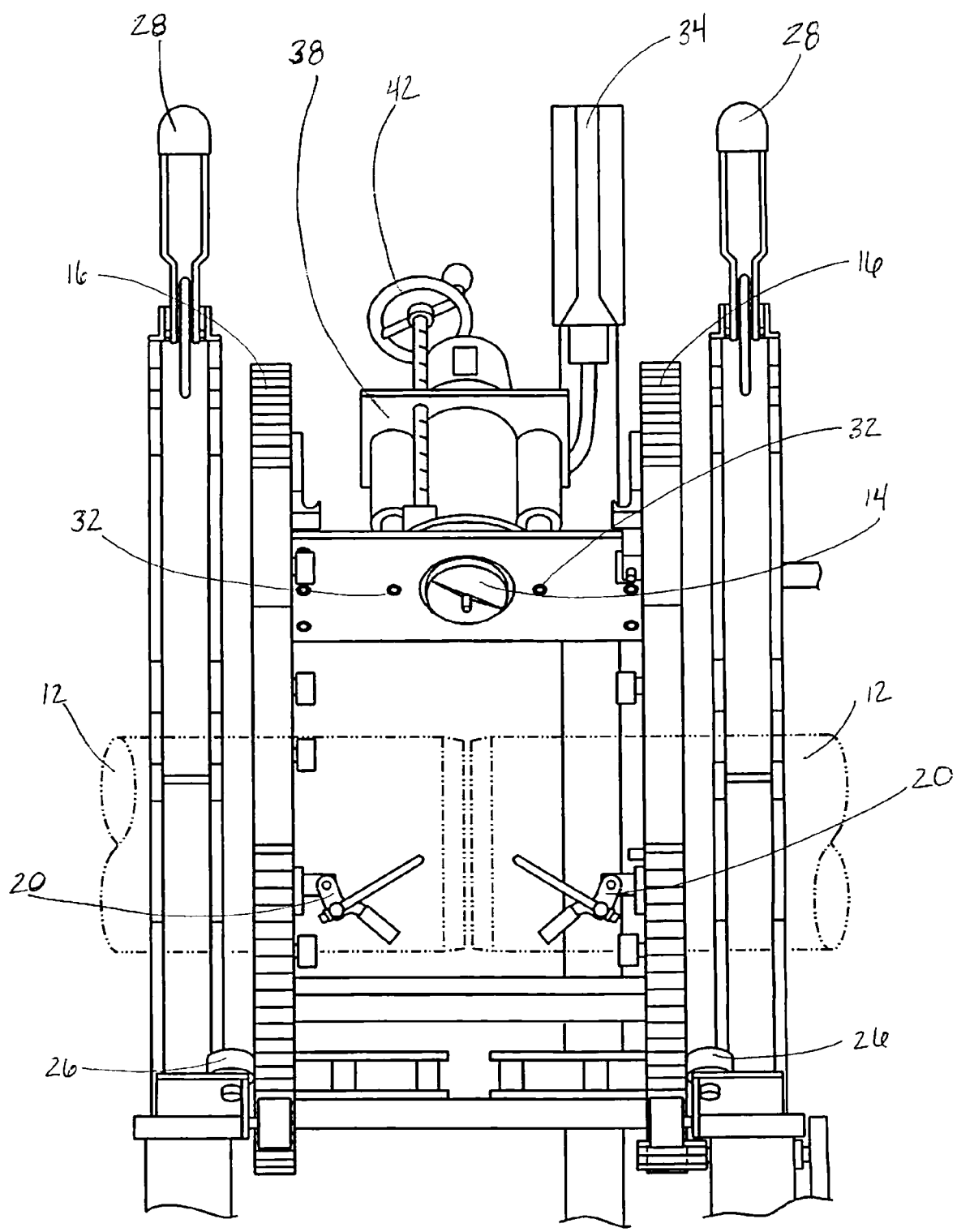
FIG. 14 is a front perspective view of the router and router bit of the pipe-cutting/chamfering device of FIG. 1.

Router 38 also has spring-loaded pipe-follower pins 32 on either side of the bit 14 to force the bit 14 away from the pipe 12 during out-of-round pipe conditions as seen in FIGS. 10 and 14. Pipe-follower-pins 32 allow bit 14 to be mechanically raised and lowered following the outside contour of pipe 12 as illustrated in FIG. 14. Router 38 and bit 14 are manually raised and lowered by activating handle 42. In an alternate embodiment, router 38 and bit 14 are raised and lowered pneumatically by two pneumatic cylinders.

Figure 5:
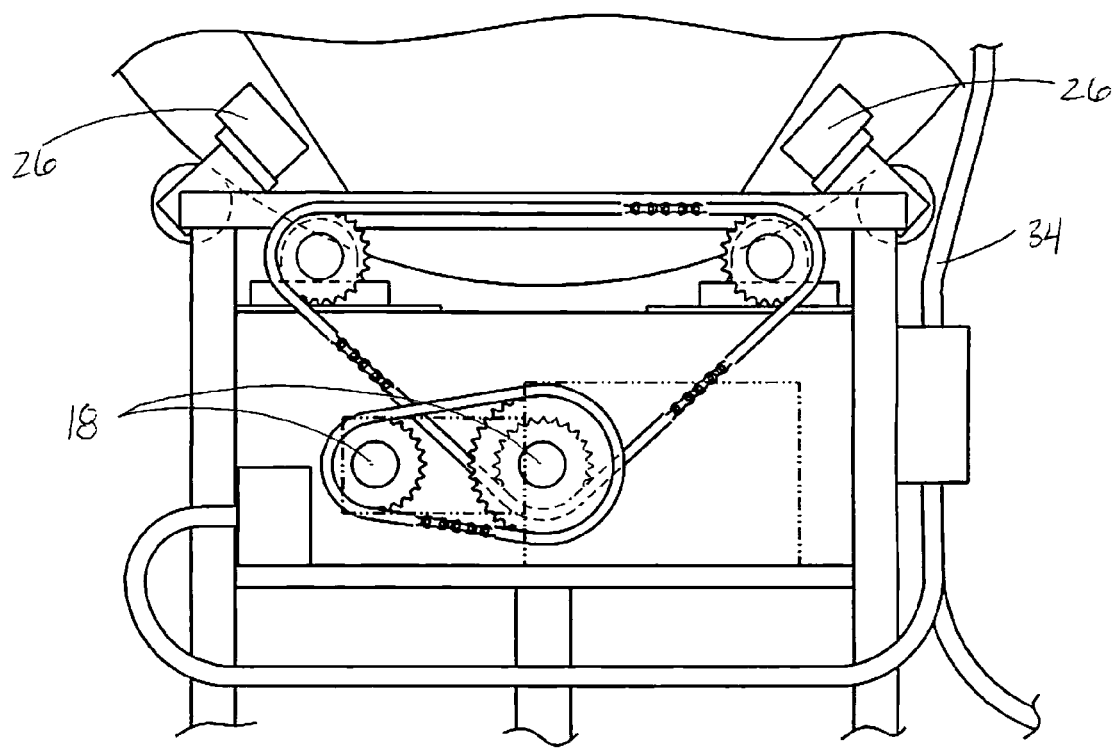
FIG. 5 is a perspective view of the drive motor of the pipe-cutting/chamfering device of FIG. 1.

Pipe-cutting/chamfering device 10 includes a drive motor 18 which advances carriage 16 in a forward direction and in a reverse direction as illustrated in FIG. 5. Drive motor 18 is preferably chain driven. Drive motor 18 also includes retractable power cord 34 as seen in FIG. 5. Pipe-cutting/chamfering device 10 also includes control panel 36 for operation of device 10 as seen in FIG. 1. Control panel 36 includes easy-to-use electrical controls and an emergency stop button.

Pipe-cutting/chamfering device 10 can simultaneously cut through a pipe 12 and chamfer the cut ends as illustrated in FIG. 10(a). A user would first support a pipe 12 at axial 46 locations on either side of an intended cutting zone on the pipe 12. Next user would orbit a router 38 having a cutting-chamfering bit 34, 360 degrees around pipe 12 to simultaneously cut through pipe 12 and chamfer the cut ends. The supporting step can also include clamping pipe 12 with pipe collect-clamps 28. The orbiting step can also include providing a split carriage 16 rotatably mounted with respect to a frame 48 about the pipe axis 46, router 38 can be affixed to the split carriage 16 and carriage 16 rotates about clamped pipe 12.

Another aspect of this invention is that a preliminary step can include selecting from a collet-clamp 28 set collet-clamps 28 sized for the pipe 12 to be cut.

Pipe-cutting/chamfering device 10 has many unique advantages. Device 10 is mobile and provides the ability to field-cut pipe 12 and chamfer the cut ends with one tool and in one step as opposed to the common practice of manually cutting through a pipe 12 and then chamfering one pipe end at a time using a cut-off saw. The cut and bevel achieved by the hand-operated method is inherently inconsistent and inferior. A primary concern is that a non-uniform bevel is more likely to cut seals used in pipe connections and create expensive waste of materials. Furthermore, it is an unsafe practice, not the least because of cut-off saw is not designed to be used as an angle grinder.

The pipe-cutting/chamfering device 10 overcomes these problems by allowing the user to quickly and accurately cut through and chamfer both cut ends simultaneously on various sized pipes, including the most common pipe sizes used in construction 6", 8" and 10" as well as other sizes including 12",15" and 18" and also larger pipe sizes, 21", 24" and 30". Furthermore, the pipe-cutting/chamfering device 10 can accommodate lengths of pipe 12 as short as one foot (for beveling a single end) and as short as two feet in cutting and beveling both cut ends simultaneously.

Pipe-cutting/chamfering device 10 can simultaneously cut and chamfer pipe made out various materials, included but not limited to, plastic, polyvinyl chloride plastic and metal.

A wide variety of materials are available for the various parts discussed and illustrated herein. Although the device has been shown and described in conjunction with specific embodiments thereof, it is to be understood that many alternatives, modifications and variations will be apparent to those skilled in the art. Accordingly. it is intended to embrace all such alternatives, modifications and variations that fall within the spirit and broad scope of the appended claims.

The invention claimed is:

1. A mobile device for simultaneously cutting and chamfering a pipe, the improvement comprising:
   a mobile frame;
   a pair of pipe collet-clamps attached to the frame and defining a principal axis;
   a split carriage rotatably mounted with respect to the frame about the axis and between the clamps;
   a router affixed to the split carriage and having a cutting-chamfering bit; and
   a drive motor for rotating the carriage;
   whereby the router orbits around the pipe simultaneously cutting it into two chamfered pipes.

2. The device of claim 1 further comprising pipe-end supports attached to the frame on opposite sides thereof.

3. The device of claim 1 wherein the router has spring-loaded pipe-follower pins on either side of the bit to force the bit away from the pipe during out-of-round pipe conditions.

4. The device of claim 1 wherein the router is spring-loaded thereby to accommodate out-of-round pipe conditions.

5. The device of claim 4 wherein the router has spring-loaded pipe-follower pins on either side of the bit to force the bit away from the pipe during out-of-round pipe conditions.

6. The device of claim 1 wherein the carriage has pipe-contact rollers thereon to facilitate relative rotation with the pipe.

7. The device of claim 1 wherein the frame has carriage-guide rollers thereon to maintain the axial position of the carriage.

8. The device of claim 1 wherein the drive motor rotates the carriage in forward and reverse directions.

9. The device of claim 1 further including a set of interchangeable collet-clamps to accommodate common pipe sizes.

10. A device for simultaneously cutting and chamfering a pipe, the improvement comprising:
- a mobile frame;
- a pair of pipe supports attached to the frame and defining with the pipe a principal axis;
- a split carriage mounted with respect to the frame relatively rotatable with respect to the supported pipe about the axis and, in the axial direction, between the pipe supports;
- a router affixed to the split carriage and having a cutting-chamfering bit; and
- a drive motor for motivating relative orbital rotation of the carriage around the pipe;
- whereby the pipe is simultaneously cut into two chamfered pipes.

* * * * *

UNITED STATES PATENT AND TRADEMARK OFFICE
CERTIFICATE OF CORRECTION

PATENT NO.          : 7,578,643 B1
APPLICATION NO.     : 12/346446
DATED               : August 25, 2009
INVENTOR(S)         : Philip Karow Page 1 of 1

It is certified that error appears in the above-identified patent and that said Letters Patent is hereby corrected as shown below:

Column 1, line 8, replace "chambering" with --chamfering--.
Column 1, beginning on line 9, replace "chamber" with --chamfer--.
Column 1, line 15, replace "chamber" with --chamfer--.
Column 1, line 18, replace "chamber" with --chamfer--.
Column 1, line 18, replace "cutting/chambering" with --cutting/chamfering--.
Column 1, line 21, replace "chambered" with --chamfered--.
Column 1, line 24, replace "chambering" with --chamfering--.
Column 1, line 25, replace "chambered" with --chamfered--.
Column 1, line 33, replace "chamber" with --chamfer--.
Column 1, line 36, replace "cutting/chambering" with --cutting/chamfering--.
Column 1, line 37, replace "chamber" with --chamfer--.
Column 1, line 52, replace "chambering" with --chamfering--.

Signed and Sealed this

Twenty-seventh Day of October, 2009

David J. Kappos
*Director of the United States Patent and Trademark Office*